Figure 11:
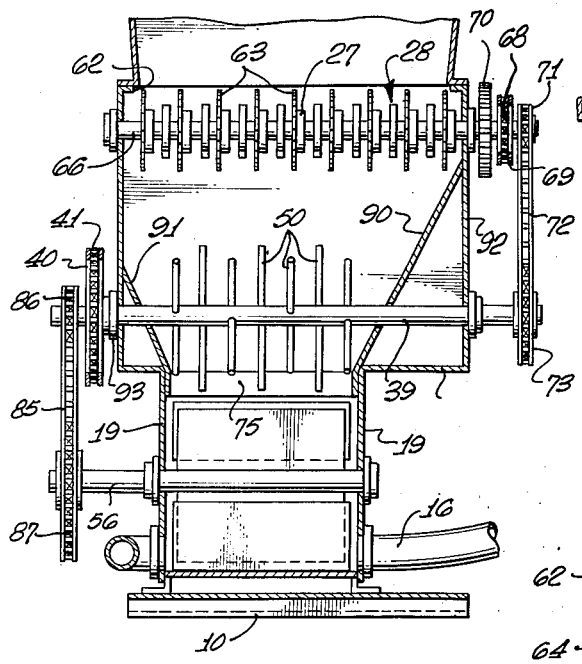

June 20, 1961 — M. O. BABB — 2,989,252
APPARATUS FOR PROCESSING FIBROUS MATERIAL
ADAPTING IT FOR GAS STREAM ENTRAINMENT
Filed July 28, 1958 — 3 Sheets-Sheet 1
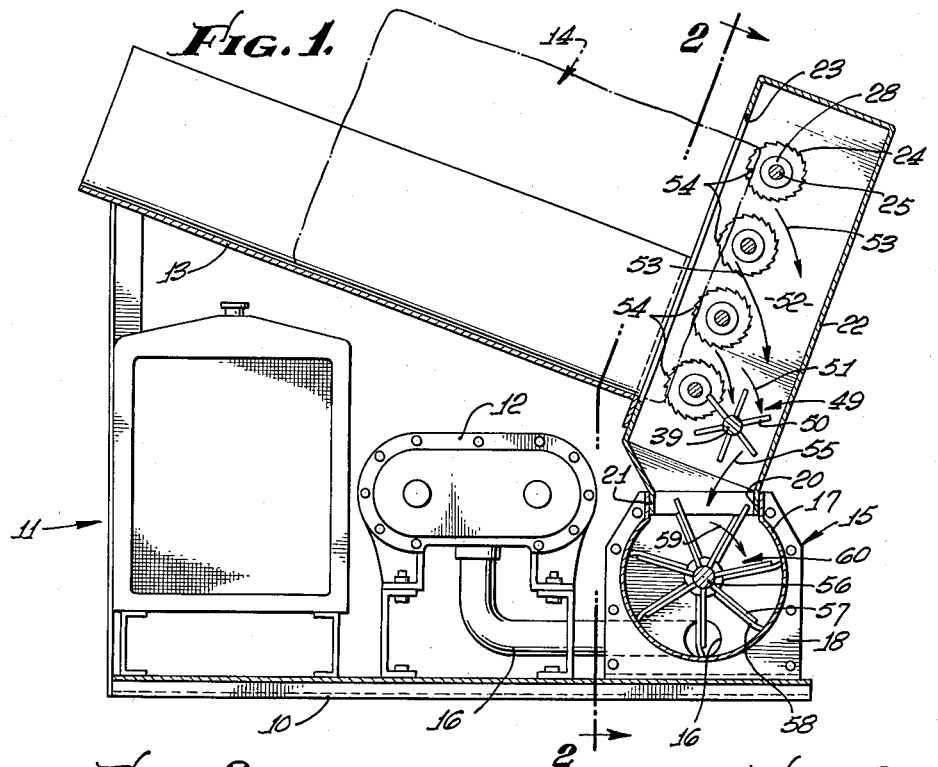
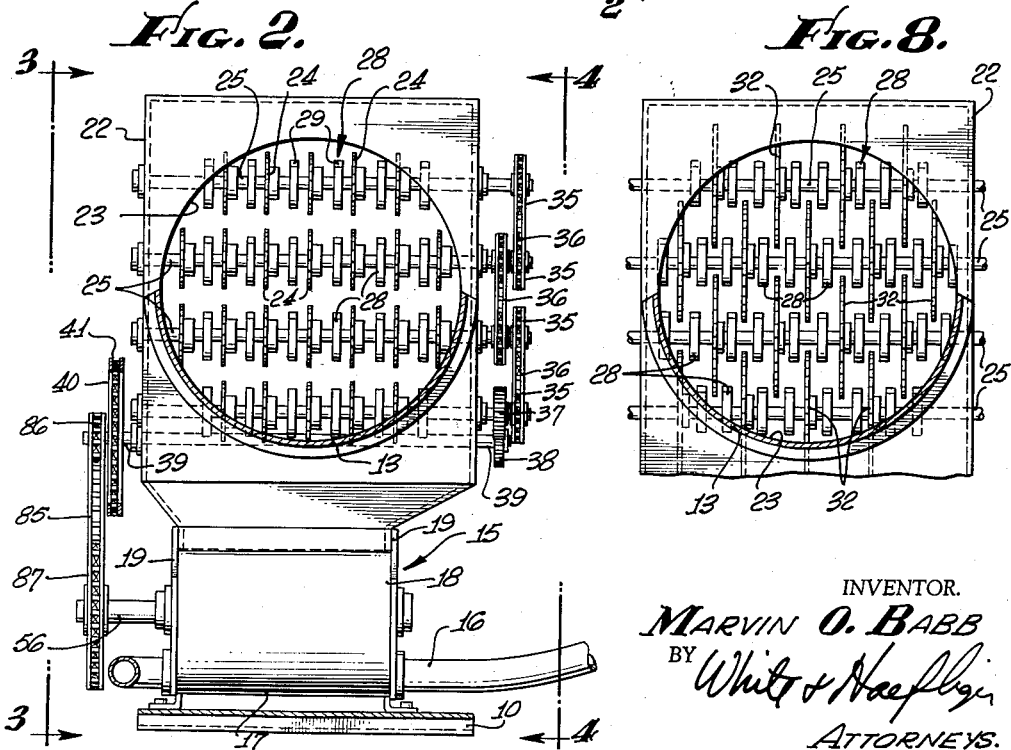
INVENTOR.
MARVIN O. BABB
BY
ATTORNEYS.

June 20, 1961  M. O. BABB  2,989,252
APPARATUS FOR PROCESSING FIBROUS MATERIAL
ADAPTING IT FOR GAS STREAM ENTRAINMENT
Filed July 28, 1958  3 Sheets-Sheet 2
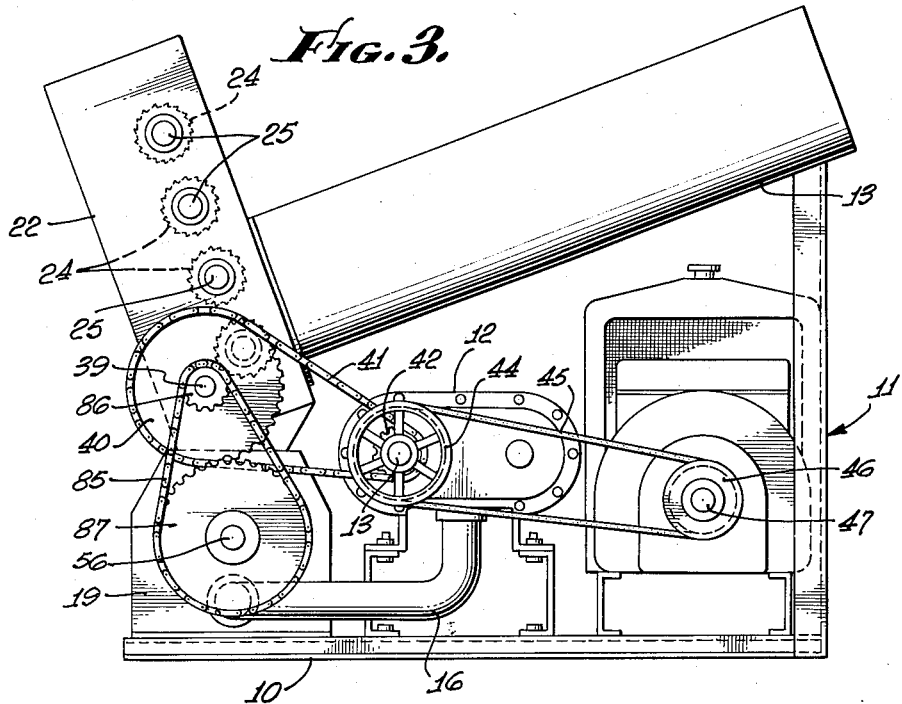
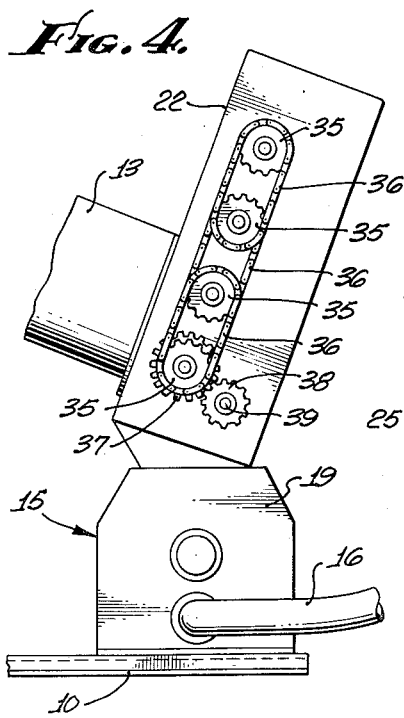
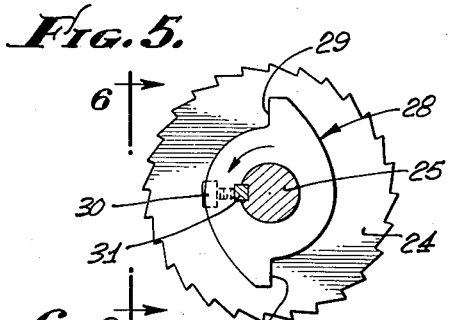
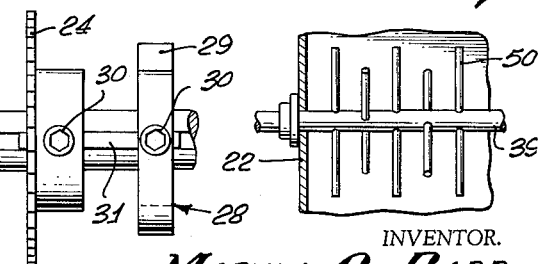
INVENTOR.
MARVIN O. BABB
BY White & Haefliger
ATTORNEYS.

June 20, 1961 M. O. BABB 2,989,252
APPARATUS FOR PROCESSING FIBROUS MATERIAL
ADAPTING IT FOR GAS STREAM ENTRAINMENT
Filed July 28, 1958 3 Sheets-Sheet 3

INVENTOR.
MARVIN O. BABB
BY
ATTORNEYS.

2,989,252
Patented June 20, 1961

2,989,252
APPARATUS FOR PROCESSING FIBROUS MATERIAL ADAPTING IT FOR GAS STREAM ENTRAINMENT
Marvin O. Babb, 1807 E. 7th St., Los Angeles 21, Calif.
Filed July 28, 1958, Ser. No. 751,326
3 Claims. (Cl. 241—138)

This invention relates generally to the handling and processing of insulation material such as rock wool and glass fibers, and more particularly concerns an apparatus for processing fibrous insulation material and in bulk form to render it adaptable for gas stream entrainment.

Speaking with reference to known apparatus for introducing insulation material in a stream of air to be conveyed by the air stream to the point or location, for example in an attic, where the insulation material is to be deposited, it is customary to supply pre-shredded insulation material to the site of an insulation job in containers or bags weighing around twenty-seven pounds. The bagged material is then emptied into a machine which feeds it to the air stream passing through a conduit to the location of insulation deposition. This method of handling the material is wasteful in that it requires the use of many bags or sacks, which in the aggregate are costly, and which must be excessively handled and processed as by filling them with the pre-shredded insulation material at the factory and emptying them at the job site, which requires the full time of an operator.

The present invention has for one of its major objects to eliminate handling of such bagged insulation material, together with rotary means for severing or knock-fibrous insulation material in bulk or unshredded form, making it suitable for gas stream entrainment at the site of a particular insulation job. It is contemplated that the insulation material be delivered from the warehouse or the factory to the job site in bulk form, for example in bales weighing around seventy-five pounds which may very easily be rolled and tied with twisted paper cord at the factory, with the consequent advantage that the use of bags for shipping shredded insulation material is eliminated.

Accordingly, in its broad concept, the invention is directed to the provision of a hopper for receiving a bulky body or bale of fibrous insulation material so that the body is adapted to advance from the hopper, spaced cutters in the path of advancement of the bulky body that are operable to cut grooves or furrows in and form into segments the forward end portions of the body or bale as it advances against the cutter, and means within which the resultant cut material is confined and from which it may flow for subsequent entrainment by the gas stream. More specifically, the apparatus is constructed to include rotary cutters spaced at intervals across the path of advancement of the bulky body or bale of insulation material, together with rotary means for severing or knocking loose the material cut into segments at the forward end of the bulky body, the rotary severing means preferably comprising impactors or knockers spaced between the rotary cutters and having shoulders extending in radial planes and openly facing in the direction of rotation of the impactors for sweeping the severed material out of and away from the cutting zone. The rotary cutters preferably project toward a housing inlet through which the baled insulation material advances toward the cutters, with the rotary impactors projecting similarly but to a lesser extent toward the inlet so that the baled material is cut into segments before it is severed by the impactors.

Other features and objects of the invention include specific arrangements of the cutters and rotary impactors which have been found to give the best results as respects cutting and severing the material in such form as is desirable for gas stream entrainment, together with a rotary shredder operable to shred or nodulate the downwardly flowing cut and severed material and a rotary carrier below the shredder having compartments for collecting the falling material for delivering it in pressure sealed batches to the pressurized gas stream.

These and other objects and advantages of the invention, as well as the details of an illustrative embodiment, will be more fully understood from the following detailed description of the drawings, in which:

FIG. 1 is a front side elevation, partly in section, of the complete apparatus operable to process baled insulation material for subsequent gas entrainment thereof;

FIG. 2 is a section taken on line 2—2 of FIG. 1;

FIG. 3 is a rear side elevation of the apparatus shown in FIG. 1;

FIG. 4 is a view taken on line 4—4 of FIG. 2;

FIG. 5 is an enlarged elevation showing a preferred arrangement of a rotary cutter and a rotary impactor mounted on a single shaft;

FIG. 6 is a view taken on line 6—6 of FIG. 5;

FIG. 7 is an enlarged frontal view of a portion of the rotary rake shown in FIG. 1;

FIG. 8 is a fragmentary view showing a modified arrangement of rotary cutters and impactors;

FIG. 9 is a view similar to FIG. 1 and taken in section through a further modified form of the apparatus;

FIG. 10 is an outside elevation of the modified apparatus of FIG. 9; and

FIG. 11 is a view taken on line 11—11 of FIG. 10.

Referring first to FIGS. 1 and 3, the overall apparatus includes a base 10 mounting an engine 11, a Roots-type constant pressure air blower 12, an inclined hopper 13 within which a bale 14 of insulation material is receivable, and means generally indicated at 15 for feeding cut, severed and shredded insulation material to a conduit 16 through which a stream of air is delivered by a blower 12. The latter means includes a drum housing 17 carried by a pair of vertical plates 18 mounted on the base 10, opposite ends of the drum housing being closed by end plates 19 shown in FIG. 2.

The drum housing has a lengthwise extending inlet 20 opening upwardly as shown in FIGS. 1 and 2 and receiving the reduced size lower end flange 21 of an enlarged upper housing 22 which is generally rectangular in cross section and is inclined from the vertical above the drum housing 17. Housing 22 has an upwardly facing and inclined inlet 23 that is circular and of a size sufficient to receive therethrough the bale 14 of insulation material as it advances slowly from the hopper 13, the latter being inclined downwardly toward the inlet 23 so that the bale tends to slide under its own weight toward and through the inlet.

Spaced across the projected area of the inlet within the housing, and presenting their cutting edges toward the inlet are circular saws 24 mounted on horizontally extending shafts 25, the axes of which extend in a common plane inclined from the vertical by an amount equal to the upward inclination of the hopper from the horizontal. The saws preferably but not necessarily being of the same diameter, their teeth are presented squarely to the advancing bale 14 for cutting into segments the forward portion of the bale as it advances against the saws which, when they are not rotated, support the forward end of the bale against unrestricted sliding down the hopper.

As seen in FIG. 2, the saw blades 24 in successive rows extend in the same vertical planes, and they are spaced apart in the same row, their hubs 27 being keyed to the shafts 25. The blade teeth are preferably hardened as by plating them with chromium or the composition known as Chromalloy, to make them longer lasting when cutting baled glass fiber and rock wool insulation.

Spaced between the blades in each row are the rotary impactors 28, partly shown in FIGS. 5 and 6 as comprising plates keyed to the shafts 25 and having opposite radial shoulders 29 facing in the direction of plate rotation and severing the insulation material for impacting and severing the insulation material shredded by the saws. Plates 28 project toward the inlet 23 to a lesser extent than do the saw blades 24 so that the insulation material is always cut into segments before it is severed and swept away or out of the cutting zone by the shoulders 29 of the impactors or knockers as the latter rotate with the cutter blades. As seen in the drawings, the width of the shoulders 29 between successive blades is substantially greater than individual blade thickness. The blades and the impactors are located axially on the shafts 25 by Allen head screws 30 bearing against the keys 31 as viewed in FIGS. 5 and 6.

The cutter blades 32 mounted on the shafts 25 in the modified arrangement of FIG. 8 have diameters greater than the spacing between the parallel shafts so that the blades on adjacent shafts overlap one another, as shown. Therefore, fewer blades are required in this embodiment. Two impactors 28 are spaced between each pair of blades on a shaft so as to straddle the periphery of blade 32 on the adjacent shaft 25, this configuration being highly efficient as respects cutting and severing of insulation material in a form best suited for gas stream entrainment.

The shafts 25 shown in FIGS. 2 and 8 are rotated in unison and in the same angular direction and rate, preferably between 400 and 600 r.p.m., by a drive mechanism including sprockets 35 mounted on the ends of the shafts projecting from the upper housing and chains 36 meshing with the sprockets. The lowermost shaft 25 additionally has a spur gear 37 keyed to its projecting end, a drive gear 38 on an auxiliary shaft 39 meshing with the spur gear to rotate all of the shafts 25. The opposite end of the auxiliary shaft 39 projecting at the opposite end of the housing 22 carries a large sprocket 40 which is driven by a chain 41 meshing with sprocket 42 on the blower shaft 43 as seen in FIG. 3. The latter shaft mounts a sheave 44 driven by a belt 45, that is in turn driven by the sheave 46 on the engine crankshaft 47. Since the sprocket 42 and gear 38 are smaller than the sprocket 40 and spur gear 37 respectively, the rotary cutters are driven at a much smaller rate of speed than the engine crankshaft.

Such speed reduction is important to the operation of a rotary shredder or nodulator generally indicated at 49, that is driven by the auxiliary shaft 39 within the upright housing 22 directly above the downwardly tapered outlet therefrom, the shredder including rod-like arms 50 projecting radially from the shaft 39 and spaced therealong as better seen in FIG. 7. The shredder is rotated in a direction opposite to the cutters and the severing impactors as indicated by the arrow 51 in FIG. 1 to downwardly displace the cut and severed insulation material falling within the zone 52 of the upright housing 22, within which material is confined after being swept away from the cutters 24. The paths of the material so swept, are generally indicated by the arrows 53 which extend away from the cutting zone 54 at the forward end of the bale 14 and downwardly into the zone 52, as a result of the direction of rotation of the impactors 28. Thus, the material is swept generally downwardly toward the shredder which acts to prevent bridging of the material in zone 52 and positively displaces the material downwardly through the tapered lower end of the housing 22.

Mounted within the drum housing is a shaft 56 extending horizontally and parallel to the shafts 25 and 39. Shaft 56 carries at least seven paddles or plates 57, extending in radial and axial planes equally spaced about the shaft axis, the paddles mounting flexible seals 58 engageable with the interior walls of the drum housing during rotation of shaft 56 to seal off the individual compartments formed by the paddles and seals. The insulation material falls into these compartments during operation of the apparatus so that material is carried in batches in a circular path as indicated by the arrows 59. Rotation is transmitted to shaft 56 by a chain 85 meshing with small and large sheaves 86 and 87 respectively mounted in shafts 39 and 56.

Such slow batchwise conveying of the shredded and severed insulation material within the compartments formed in the rotary carrier or feeder generally indicated at 60, is important to the efficient delivery of all the material to the conduit 16, which connects into the opposite end plates 19 of the drum housing 17. Thus, as the pressurized air stream delivered through the conduit 16 passes through the housing 17 in an endwise direction, it sweeps the insulation material from compartments in the feeder 60 as they successively register with the conduit inlet and outlet openings 61 in the opposite end plates 19. At the same time, the paddles 57 and seals 58 prevent escape of the air pressure from within the housing 17 as the air stream passes therethrough. To contain such air pressure it is very important that at least two seals 58 be in engagement with the interior and end walls of the housing 17 at all times to bar escape of the air pressure. This is only realized through the provision of at least seven paddles and seals equally spaced about the axis of the shaft 56, as shown.

From the foregoing it will be apparent that I have provided an apparatus for processing baled insulation material of the rock wool, Fiberglas or similar fibrous types, directly at the site of an insulation job or project and thereby obviating the necessity for supplying bagged, previously shredded insulation material to the job. Once a large bale of insulation material is placed in the hopper, the apparatus is self-operating to feed the bale, cut and sever the material at the forward end thereof, and to shred and feed the material to the air stream for delivery in the conduit to the insulation deposit location. Where formerly an operator had to handle many bags of previously shredded insulation material, emptying them into apparatus for blowing the material to the deposit location, it is now possible through the use of the present apparatus to carry out an insulation job with no continuous tending or feeding of the apparatus as by former methods.

Figure 9:
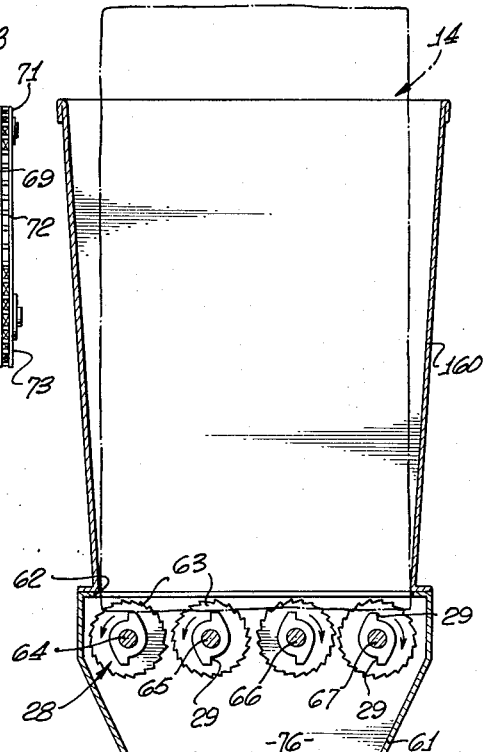
Figure 10:
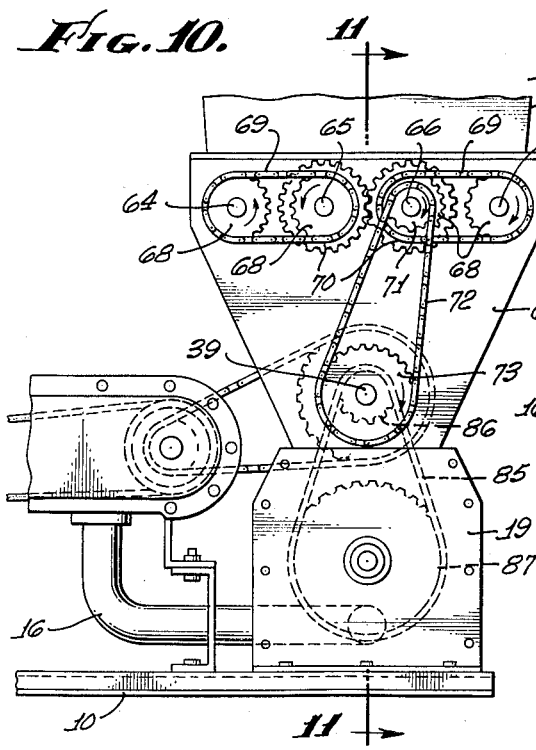

In the modifications shown in FIGS. 9–11, the arrangement of the bale feeding, cutting and knocking portions of the apparatus are altered, whereas the remainder of the apparatus remains generally the same as previously described. Thus, the hopper 160 is now vertically elongated and downwardly tapered to loosely receive the insulation bale 14 in vertically extended position. Supporting the hopper is a sharply downwardly tapering housing 61 having an enlarged inlet or mouth 62 through which the bale advances downwardly under the influence of gravity.

Directly below the inlet are the rotary cutters or saw blades 63 extending in vertical planes and mounted at horizontally spaced intervals on the four parallel, horizontally spaced shafts 64–67. The ends of these shafts project from the housing as seen in FIG. 10 and mount sprockets 68, chains 69 being provided to mesh with pairs of sprockets carried by adjacent shafts 64 and 65 and by adjacent shafts 66 and 67. The inner shafts 65 and 66 mount intermeshing gears 70 and inner shaft 66 carries a sprocket 71 driven by a chain 72 off a sprocket 73 on the auxiliary shaft 39 of the shredder. As a result, shafts 64 and 65 are rotated counterclockwise as seen in FIG. 10, whereas shafts 66 and 67 are rotated clockwise, and the bale is kept centered in the hopper 160 during cutting of the lower end thereof by the equal numbers of oppositely rotating saw blades.

The housing 61 in FIGS. 9–11 is shown as being severely tapered downwardly to the outlet 75 formed by flange 21, and it is the function of the shredder 49 to prevent bridging of the loose insulation material across the housing interior zone 76 by positively displacing the material downwardly to the feeder 60, the material being loosely compacted during such displacement. Thus, a continuous downward flow of the material is maintained, overcoming the inherent tendency of the material to resist flowing. In FIG. 11 the housing is shown to include opposite interior baffles 90 and 91 tapering downwardly to the outlet 75, and an outer shell wall 92 supporting bearings 93 for the shaft 39 in closely spaced relation to sprockets 40 and 73.

I claim:

1. Apparatus for processing a body of fibrous insulation material adapting it for gas stream entrainment, comprising a vertically upright hopper for receiving said body and from which said body is adapted to advance vertically downwardly, rotary cutters having blades spaced at intervals across the path of said body advancement and rotatable in vertical planes to cut into segments the forward end portion of said body as it advances downwardly against said cutters, rotary means including impactors for severing the cut segments of material at the forward end of said body as the impactors strike said segments, said impactors having impact shoulder width between successive blades that is greater than individual blade thickness, said cutters and impactors being rotatable about parallel axes, some of said cutters and impactors being mounted for clockwise rotation and others of said cutters and impactors being mounted for counterclockwise rotation thereby to keep the body approximately centered with respect to the hopper as the body travels downwardly therein, and housing means within which said cut and severed material is confined and from which it is adapted to flow downwardly for subsequent entrainment by said gas stream, said housing means having an inlet through which said body advances toward said cutters, the transverse dimension of said inlet being substantially larger than the maximum transverse dimensions of individual cutters, and said housing means forming a flow passage containing said cutters and extending openly and downwardly to substantial extent beneath said cutters and impactors to permit the severed material to fall freely downwardly away from the cutters without collecting at the cutters as the material is severed, said housing means tapering downwardly to concentrate the severed material as it moves downwardly away from the cutters.

2. The invention as defined in claim 1 in which said rotary cutters are spaced across the projected area of said inlet within said housing and present their cutting edges toward said inlet, and said impactors are spaced from the blades to impact terminal end portions of the segments advancing between the cutters, and parallel shafts mounting half of said cutters and impactors to rotate clockwise and half of said cutters and impactors to rotate counterclockwise.

3. The invention as defined in claim 2 in which said housing inlet opens upwardly, and in which said hopper tapers downwardly for guiding said body advancement vertically downwardly through said inlet, said cutters and impactors being horizontally spaced apart and directly underlying said housing inlet, the clockwise rotary cutters and impactors being mounted on two parallel shafts at one side of a vertical plane bisecting said inlet, and the counterclockwise rotary cutters and impactors being mounted on two parallel shafts at the other side of said plane.

References Cited in the file of this patent

UNITED STATES PATENTS

| | | |
|---|---|---|
| 537,764 | Gillet | Apr. 16, 1895 |
| 1,844,279 | Gossard | Feb. 9, 1932 |
| 1,908,548 | Smith | May 9, 1933 |
| 2,026,732 | Farley | Jan. 7, 1936 |
| 2,084,764 | Constantine | June 22, 1937 |
| 2,236,969 | Flatboe | Apr. 1, 1941 |
| 2,355,358 | Anderson | Aug. 8, 1944 |
| 2,532,318 | Mackey | Dec. 5, 1950 |
| 2,584,262 | De Lamater | Feb. 5, 1952 |
| 2,731,208 | Dodd | Jan. 17, 1956 |
| 2,753,908 | Anderson | July 10, 1956 |
| 2,858,080 | Couchot | Oct. 28, 1958 |
| 2,889,862 | Williamson | June 9, 1959 |
| 2,903,193 | Anderson | Sept. 8, 1959 |

FOREIGN PATENTS

| | | |
|---|---|---|
| 13,159 | Great Britain | June 1, 1911 |
| 307,548 | Germany | Sept. 5, 1918 |
| 437,242 | Great Britain | Oct. 25, 1935 |
| 887,126 | Germany | Aug. 20, 1953 |
| 1,050,684 | France | Sept. 2, 1953 |